US012725473B2

(12) United States Patent
Einberg

(10) Patent No.: US 12,725,473 B2
(45) Date of Patent: Sep. 1, 2026

(54) DETERMINING WHEN TO ESTABLISH A COMMUNICATION CHANNEL FOR ACCESS CONTROL

(71) Applicant: ASSA ABLOY AB, Stockholm (SE)

(72) Inventor: Fredrik Einberg, Huddinge (SE)

(73) Assignee: ASSA ABLOY AB, Stockholm (SE)

( * ) Notice: Subject to any disclaimer, the term of this patent is extended or adjusted under 35 U.S.C. 154(b) by 337 days.

(21) Appl. No.: 18/687,021

(22) PCT Filed: Oct. 14, 2022

(86) PCT No.: PCT/EP2022/078702

§ 371 (c)(1),
(2) Date: Feb. 27, 2024

(87) PCT Pub. No.: WO2023/062212

PCT Pub. Date: Apr. 20, 2023

(65) Prior Publication Data

US 2024/0362961 A1 Oct. 31, 2024

(30) Foreign Application Priority Data

Oct. 15, 2021 (SE) .................................... 2151268-6
Oct. 15, 2021 (SE) .................................... 2151269-4

(51) Int. Cl.
*G07C 9/00* (2020.01)
*H04W 76/14* (2018.01)

(52) U.S. Cl.
CPC ..... *G07C 9/00309* (2013.01); *G07C 2209/63* (2013.01); *H04W 76/14* (2018.02)

(58) Field of Classification Search
CPC ............ G07C 9/00309; G07C 2209/63; G07C 2209/08
See application file for complete search history.

(56) References Cited

U.S. PATENT DOCUMENTS 9,483,887 B1 11/2016 Soleimani
10,152,838 B2 12/2018 Einberg
(Continued)

FOREIGN PATENT DOCUMENTS

EP 3147868 3/2017
FR 2820535 8/2002
(Continued)

OTHER PUBLICATIONS

"PCT EP 2022078702 ISR mailed Jan. 23, 2023", 5 pages.
(Continued)

*Primary Examiner* — Nabil H Syed
(74) *Attorney, Agent, or Firm* — Schwegman Lundberg & Woessner, P.A.

(57) ABSTRACT

It is provided a method for determining when to establish a communication channel using an electronic lock (12) controlling access to a restricted physical space (16). The method is performed by a portable key device (2). The method comprises: obtaining (40) a first time-indicator indicating when the portable key device (2) detects a stop in motion of the portable key device (2); receiving (42) a broadcast message from the electronic lock (12); deriving (44) a second time-indicator based on the received broadcast message, the second time-indicator indicating when the electronic lock (12) determines a stop in motion; determining (46) that a difference between the first time-indicator and the second time-indicator is less than a threshold; and establishing (48) a communication channel between the portable key device and the electronic lock when it is determined that the difference between the first time-indicator and the second time-indicator is less than the threshold.

11 Claims, 3 Drawing Sheets

(56) References Cited

U.S. PATENT DOCUMENTS

| | | | | |
|---|---|---|---|---|
| 10,249,122 | B1 * | 4/2019 | Aksamít | G07C 9/00309 |
| 2002/0084887 | A1 | 7/2002 | Arshad et al. | |
| 2014/0049361 | A1 | 2/2014 | Ahearn et al. | |
| 2017/0372549 | A1 | 12/2017 | Einberg | |
| 2019/0039570 | A1 * | 2/2019 | Foster | G07C 9/00309 |
| 2020/0020184 | A1 * | 1/2020 | Noll | G07C 9/00309 |
| 2020/0051351 | A1 | 2/2020 | Shin | |
| 2020/0349785 | A1 | 11/2020 | Kuenzi et al. | |
| 2021/0035391 | A1 * | 2/2021 | Einberg | G07C 9/28 |
| 2022/0009445 | A1 * | 1/2022 | Huschenbett | B60R 25/24 |

FOREIGN PATENT DOCUMENTS

| | | |
|---|---|---|
| WO | 2014107196 | 7/2014 |
| WO | 2020058294 | 3/2020 |
| WO | 2023062212 | 4/2023 |

OTHER PUBLICATIONS

"PCT EP 2022078702 Written Opinion mailed Jan. 23, 2023", 8 pages.
"SE Application 2151268-6 Office Action mailed Jun. 22, 2022", 8 pages.
"SE Application 2151268-6 Office Action mailed Sep. 7, 2023", 6 pages.
"SE Application 2151269-4 Office Action mailed Jun. 22, 2022", 10 pages.

* cited by examiner

DETERMINING WHEN TO ESTABLISH A COMMUNICATION CHANNEL FOR ACCESS CONTROL

CROSS-REFERENCE TO RELATED APPLICATION(S)

This application is a national stage application under 35 U.S.C. § 371 of PCT Appl. No. PCT/EP2022/078702, titled "Determining When to Establish a Communication Channel for Access Control," filed Oct. 14, 2022, which claims priority to Swedish Patent Appl. No. 2151268-6, filed Oct. 15, 2021, and to Swedish Patent Appl. No. 2151269-4, filed Oct. 15, 2021, each of which is incorporated herein by reference in its entirety.

TECHNICAL FIELD

The present disclosure relates to the field of access control and in particular to determining when to establish a communication channel for access control.

BACKGROUND

Locks and keys are evolving from the traditional pure mechanical locks. These days, there are wireless interfaces for electronic locks, based on interaction with a portable key device. For instance, Radio Frequency Identification (RFID) has been used as the wireless interface.

When RFID is used, the user needs to present the portable key device in close proximity to a reader connected to the lock. Moreover, RFID requires a relatively large antenna in the reader by the lock and uses a large amount of energy.

Another solution is to use Bluetooth Low Energy (BLE) or Ultra High Frequency (UHF), supporting a longer communication range. This enables a solution that is similar to keyless entry for vehicles, also known as seamless entry. Seamless entry is when a user does not need to explicitly present the credential for access. For instance, the credential can be kept in a handbag or in a pocket. When the user approaches the door, the electronic lock communicates with the credential to authorise the credential and grants access, if the credential authorised.

However, the longer range also allows more portable key devices to communicate with the electronic lock which can crowd resourced. For instance, consider the situation where the electronic lock is used in a sports venue, a concert venue or public transport. All portable key devices within range of the electronic lock would then establish contact with the electronic lock, which would crowd the radio interface and use more energy than necessary.

SUMMARY

One object is to reduce unnecessary communication between an electronic lock and portable key devices.

According to a first aspect, it is provided a method for determining when to establish a communication channel for access control using an electronic lock controlling access to a restricted physical space. The method is performed by a portable key device. The method comprises: obtaining a first time-indicator indicating when the portable key device detects a stop in motion of the portable key device; receiving a broadcast message from the electronic lock; deriving a second time-indicator based on the received broadcast message, the second time-indicator indicating when the electronic lock determines a stop in motion; determining that a difference between the first time-indicator and the second time-indicator is less than a threshold; and establishing a communication channel between the portable key device and the electronic lock when it is determined that the difference between the first time-indicator and the second time-indicator is less than the threshold.

The broadcast message may comprise a time lapse indicator. In this case, the deriving the second time-indicator comprises: determining a current time of the portable key device; and subtracting the time lapse indicator from the current time to obtain the second time-indicator.

The time lapse indicator may indicate an amount of time that lapsed between the time that the electronic lock determined a stop in motion and the time when the electronic lock generated the broadcast message, within a margin of error.

The obtaining a first time-indicator may be based on accelerometer data of the portable key device.

The establishing a communication channel may comprise establishing a communication channel between the portable key device and the electronic lock only when it is determined that the difference between the first time-indicator and the second time-indicator is less than the threshold.

The method may further comprise: determining that a received signal strength of a signal from the electronic lock is greater than a first threshold; notifying a user of the portable key device of a nearby electronic lock; receiving user input from the user indicating intent to unlock the electronic lock; determining that a received signal strength of a signal from an electronic lock is greater than a second threshold, wherein the second threshold is greater than the first threshold. In this case, the establishing a communication channel between the portable key device and the electronic lock is performed after determining that the received signal strength is greater than the second threshold.

According to a second aspect, it is provided a portable key device for determining when to establish a communication channel for access control using an electronic lock controlling access to a restricted physical space. The portable key device comprises: a processor; and a memory storing instructions that, when executed by the processor, cause the portable key device to: obtain a first time-indicator indicating when the portable key device detects a stop in motion of the portable key device; receive a broadcast message from the electronic lock; derive a second time-indicator based on the received broadcast message, the second time-indicator indicating when the electronic lock determines a stop in motion; determine that a difference between the first time-indicator and the second time-indicator is less than a threshold; and establish a communication channel between the portable key device and the electronic lock when it is determined that the difference between the first time-indicator and the second time-indicator is less than the threshold.

The broadcast message may comprise a time lapse indicator. In this case, the instructions to derive the second time-indicator comprise instructions that, when executed by the processor, cause the portable key device to: determine a current time of the portable key device; and subtract the time lapse indicator from the current time to obtain the second time-indicator.

The time lapse indicator may indicate an amount of time that lapsed between the time that the electronic lock determined a stop in motion and the time when the electronic lock generated the broadcast message, within a margin of error.

The instructions to obtain may comprise instructions that, when executed by the processor, cause the portable key device to obtain the first time-indicator based on accelerometer data of the portable key device.

The instructions to establish a communication channel may comprise instructions that, when executed by the processor, cause the portable key device to establish a communication channel between the portable key device and the electronic lock only when it is determined that the difference between the first time-indicator and the second time-indicator is less than the threshold.

The portable key device may further comprise instructions that, when executed by the processor, cause the portable key device to: determine that a received signal strength of a signal from the electronic lock is greater than a first threshold; notify a user of the portable key device of a nearby electronic lock; receive user input from the user indicating intent to unlock the electronic lock; determine that a received signal strength of a signal from an electronic lock is greater than a second threshold, wherein the second threshold is greater than the first threshold. In this case, the instructions to establish a communication channel between the portable key device and the electronic lock comprise instructions that, when executed by the processor, cause the portable key device to establish the communication channel after determining that the received signal strength is greater than the second threshold.

According to a third aspect, it is provided a computer program for determining when to establish a communication channel for access control using an electronic lock controlling access to a restricted physical space. The computer program comprises computer program code which, when executed on a portable key device, causes the portable key device to: obtain a first time-indicator indicating when the portable key device detects a stop in motion of the portable key device; receive a broadcast message from the electronic lock; derive a second time-indicator based on the received broadcast message, the second time-indicator indicating when the electronic lock determines a stop in motion; determine that a difference between the first time-indicator and the second time-indicator is less than a threshold; and establish a communication channel between the portable key device and the electronic lock when it is determined that the difference between the first time-indicator and the second time-indicator is less than the threshold.

According to a fourth aspect, it is provided a computer program product comprising a computer program according to the third aspect and a computer readable means comprising non-transitory memory in which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

According to embodiments presented herein, communication between a portable key device of a user and an electronic lock is triggered in a more efficient manner than what is known in the prior art. A stop in motion of the user is detected both by the portable key device (e.g. using an accelerometer) and by the electronic lock (e.g. by detecting a stop of a nearby object using a fixedly mounted sensor). The electronic lock then creates a broadcast message and optionally includes a time lapse indicator, indicating the amount of time that has passed since the stop was detected. The portable key device can then, based on subtracting the time-lapse indicator from a current time, determine the time of the electronic lock detecting a stop. When the stop indicator times (originating from the portable key device and the electronic lock) match (within a certain accuracy), this indicates that the user of the portable key device is the user that is near the electronic lock. At this stage, the portable key device initiates communication with the electronic lock.

Figure 1:
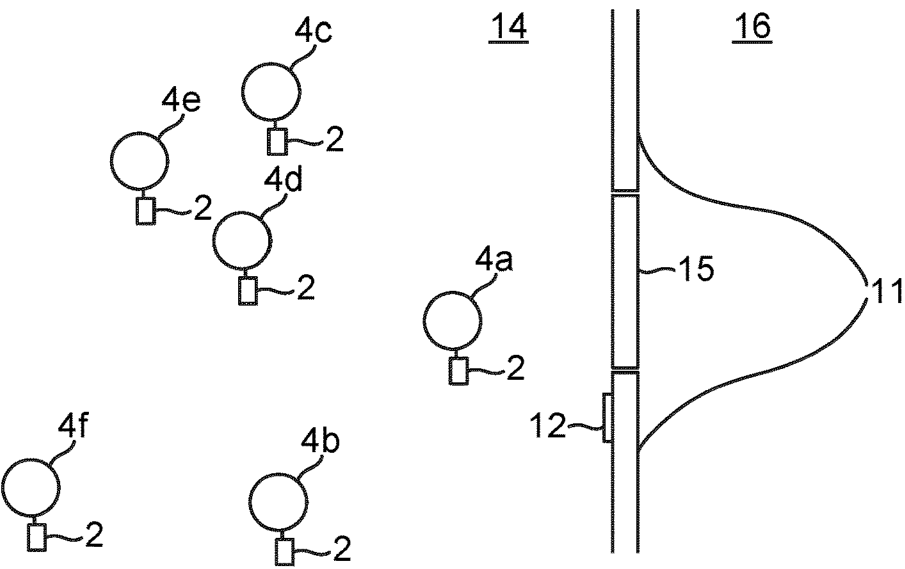
FIG. 1 is a schematic diagram illustrating an environment in which embodiments presented herein can be applied.

FIG. 1 is a schematic diagram illustrating an environment in which embodiments presented herein can be applied. Access to a physical space 16 is restricted by an openable physical barrier 15, which is selectively unlockable. The openable physical barrier 15 stands between the restricted physical space 16 and an accessible physical space 14. Note that the accessible physical space 14 can be a restricted physical space in itself, but in relation to this particular barrier 15, the accessible physical space 14 is accessible. In other words, the restricted physical space 16 is inside the barrier 15 and the accessible physical space 14 is outside the barrier 15. The openable physical barrier 15 can be a door, gate, turnstile, hatch, window, drawer, etc. In order to unlock or lock the barrier 15, an electronic lock 12 is provided. The barrier 15 is provided in a surrounding fixed structure 11, such as a wall or fence.

One or more users 4*a*-*f* are in the vicinity of the electronic lock 12. Each one of the users 4*a*-*f* carries a portable key device 2. The portable key device 2 can be implemented as a smart phone, wearable device, key fob, etc. The electronic lock 12 is able to communicate with the portable key devices 2 over a communication channel which may be a short-range wireless interface. Optionally, the electronic lock 12 comprises a separate unit, also known as an access control reader, for communicating with the portable key devices 2 and evaluating access. The portable key devices 2 are implemented using any suitable device which is portable by a user and which can be used by the electronic lock 12 to evaluate whether to grant access or not by communicating over the communication channel. The portable key devices 2 can comprise digital cryptographic keys for electronic authentication.

The short-range wireless interface between the portable key devices 2 and the electronic lock 12 is a radio frequency wireless interface and could e.g. employ Bluetooth, Bluetooth Low Energy (BLE), ZigBee, any of the IEEE 802.11 standards, any of the IEEE 802.15 standards, wireless Universal Serial Bus (USB), etc. Using the communication channel, the identity of the portable key devices 2 can be obtained and access control can be performed by the electronic lock 12. The communication over the short-range wireless interface can be encrypted. The short-range wireless interface supports broadcast messages, at least from the electronic lock 12 to any listening portable key devices 2 within range.

When the access control by the electronic lock 12 results in granted access, the electronic lock 12 is set in an unlocked state. When the electronic lock 12 is in the unlocked state, the barrier 15 can be opened and when the electronic lock 12 is in a locked state, the barrier 15 cannot be opened. In this way, access to a closed space 16 is controlled by the electronic lock 12. It is to be noted that the electronic lock 12 can be mounted in the fixed structure 11 by the physical barrier 15 (as shown) or in the physical barrier 15 itself (not shown).

An issue arises when there are many users and thus many portable key devices in the vicinity of the electronic lock 12. Consider e.g. the situation of a concert venue or public transport. In this case, if the electronic lock 12 were to establish contact with all portable key devices within range, this would crowd resources such as communication channels, making communication slower and wasting energy. Only one user, in this case the first user 4*a*, and its portable key device is closest to the electronic lock 12 at the time.

Hence, according to embodiments presented herein, a stop in motion is detected by the portable key devices 2. The time of this detection is recorded in a first time-indicator. Also, a stop in motion of a nearby object is detected by the electronic lock 12. The portable key devices can derive a second time-indicator, indicating when the electronic lock detected the stop in motion, based on information contained in a broadcast message from the electronic lock 12. In this way, the portable key devices can determine when the first and second time-indicators match, indicating that the user of the portable key device is the one that is closest to the electronic lock 12. Only when the match occurs, does the portable key device in question establish communication with the electronic lock 12. In this way, the communication between the portable key devices 2 and the electronic lock 12 is not set up prematurely when another portable key device is closer to the lock.

Figure 2:
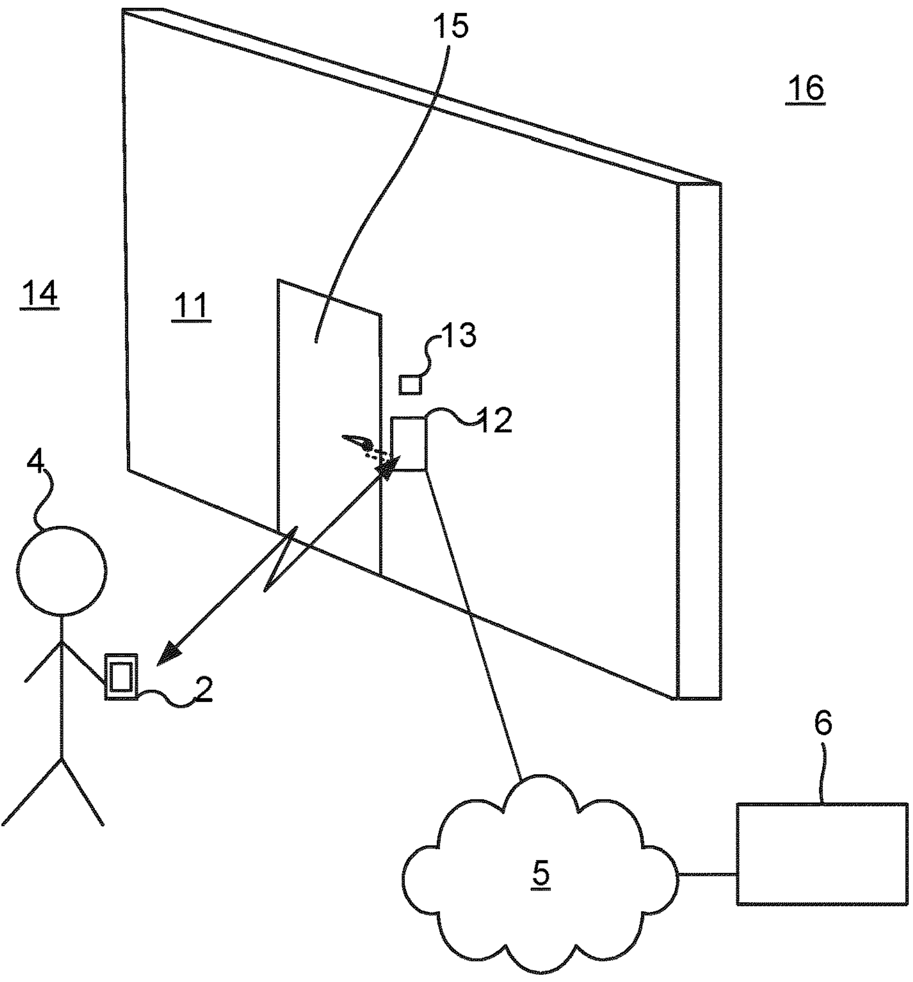
FIG. 2 is a schematic diagram illustrating in more detail the environment around the electronic lock.

FIG. 2 is a schematic diagram illustrating in more detail the environment around the electronic lock 12.

A distance sensor 13 provided in proximity to the electronic lock 12. The distance sensor 13 can be provided in the surrounding fixed structure 11. The distance sensor 13 can be a time of flight (ToF) sensor which can measure distance to an object within a specified field of view, allowing the distance to an approaching user 4 to be determined. The ToF sensor comprises an emitter that sends a transmission that is reflected by surrounding objects. The reflected transmission is received by the ToF sensor. By measuring the time between the emitted transmission and received reflected transmission, a distance to surrounding object(s) can be determined. The ToF sensor can be RF (radio frequency) based, and/or light based, such as LIDAR (Light Detection and Ranging). Alternatively or additionally, the distance sensor 13 can comprise one or more 2D cameras and/or 3D cameras, which are used to estimate distance to the user 4 from the distance sensor 13. The distance sensor 13 can thus be used to determine when an object (such as a user) near the electronic lock 12 stops.

The electronic lock 12 and/or the portable key device 2 optionally contain communication capabilities to connect via a network 5 to a server 6 of an electronic access control system. The network 5 can be a wide area network, such as the Internet, to which the electronic lock 12 and/or the portable key devices 2 can connect e.g. via Wi-Fi (e.g. any of the IEEE 802.11x standards) or a cellular network, e.g. LTE (Long Term Evolution), next generation mobile networks (fifth generation, SG), UMTS (Universal Mobile Telecommunications System) utilising W-CDMA (Wideband Code Division Multiplex), etc.

Figure 3A:
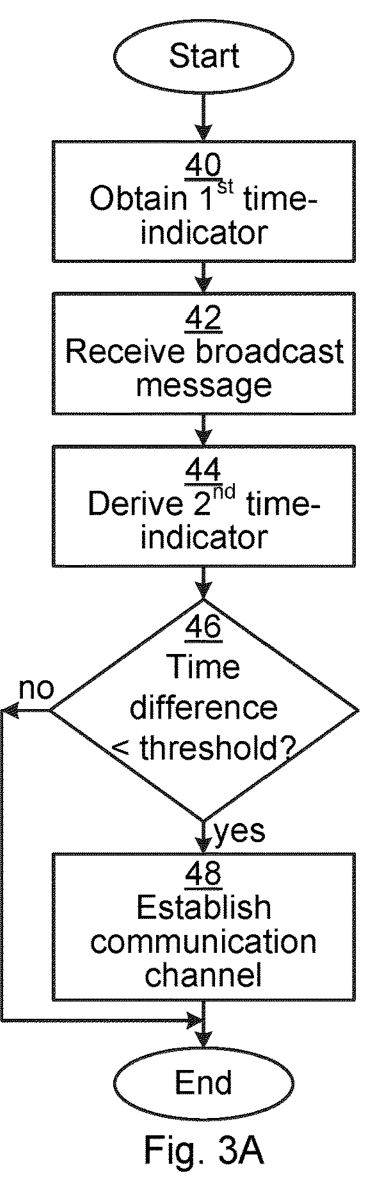
FIGS. 3A-C are flow charts illustrating embodiments of methods for determining when to establish a communication channel for access control using an electronic lock.
Figure 3B:
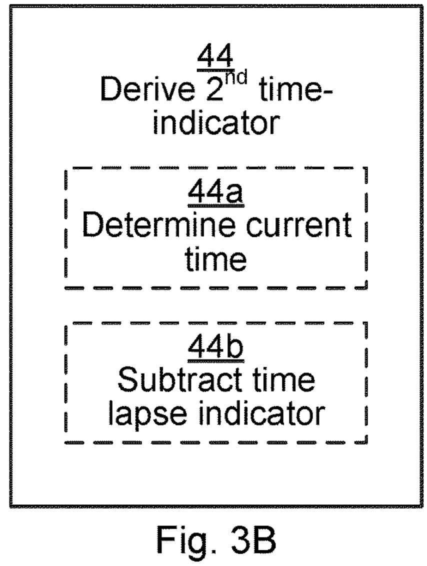
Figure 3C:
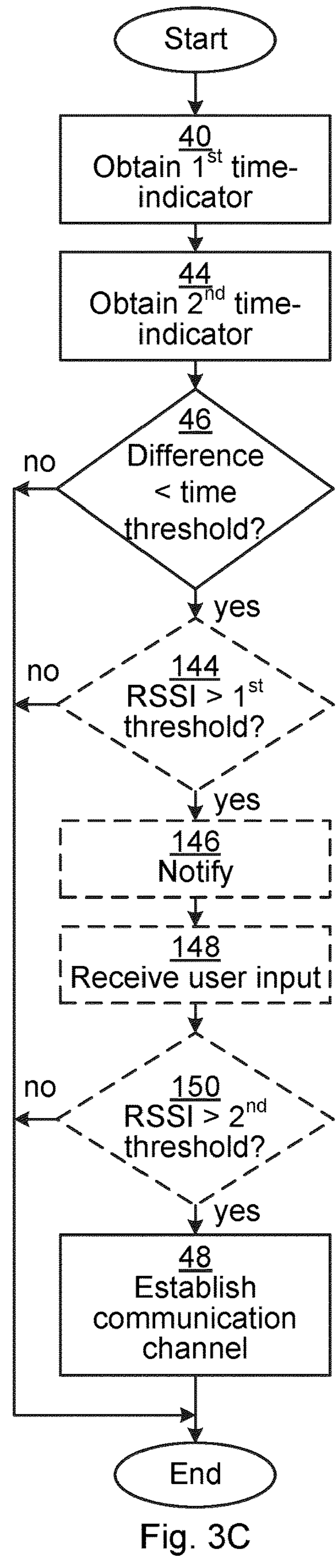

FIGS. 3A-C are flow charts illustrating embodiments of methods for determining when to establish a communication channel for access control using an electronic lock 12. As explained above, the electronic lock is used to control access to a restricted physical space 16. The method is performed by a portable key device 2.

In an obtain 1$^{st}$ time-indicator step 40, the portable key device 2 obtains a first time-indicator. The first time-indicator indicating when the portable key device 2 detects a stop in motion of the portable key device 2. The first time-indicator can e.g. be based on accelerometer data of the portable key device 2. The accelerometer data can be used to determine when the portable key device stops, e.g. when there is a relatively large deceleration followed by a period of acceleration metrics with small magnitude.

In a receive broadcast message step 42, the portable key device 2 receives a broadcast message from the electronic lock 12. The broadcast message can e.g. be a BLE advertisement message or any other suitable broadcast message supporting the inclusion of custom data by the electronic lock 12. It is to be noted that the electronic lock 12 can repeat the transmission of broadcast messages (with updated second time-indicator or lapse indicator, mentioned below) for reception by one or more portable key devices. The repeating of the broadcast message allows a portable key device to perform this method, even if the portable key device would fail to receive one or more broadcast messages. The transmission of the broadcast message by the electronic lock can be triggered by the electronic lock detecting the stop.

In a derive 2$^{nd}$ time-indicator step 44, the portable key device 2 derives a second time-indicator based on the received broadcast message, the second time-indicator indicating when the electronic lock 12 determines a stop in motion. The second time-indicator can be explicitly included in the message, in which case the clocks of the electronic lock 12 and the portable key device 2 need to be relatively well synchronised. Alternatively, as explained in more detail below with reference to FIG. 3B, the broadcast message comprises information that allows the portable key device 2 to derive the second time-indicator without relying on synchronicity of the clocks of the portable key device 2 and the electronic lock 12.

In a conditional time difference<threshold step 46, the portable key device 2 determines when a difference between the first time-indicator and the second time-indicator is less than a threshold. This then indicates that the stop detection by the portable key device 2 and the stop detection by the electronic lock 12 occurred at the same time, i.e. they both detect the same stop. Hence, the stop detected by the portable key device is also the portable key device of the user that is closest to the electronic lock. When the difference between the first time-indicator and the second time-indicator is less than the threshold, the method proceeds to an establish communication channel step 48. Otherwise, the method ends.

In the establish communication channel step 48, the portable key device 2 establishes a (two-way) communication channel between the portable key device 2 and the electronic lock 12. Subsequently, access control can be performed by the portable key device 2 and the electronic lock 12 communicating over the communication channel.

After completing the method, the method can be repeated as necessary.

Looking now to FIG. 3B, this illustrates optional sub-steps of the derive $2^{nd}$ time-indicator step 44. In the embodiments illustrated by FIG. 3B, the broadcast message (received in step 42) comprises a time lapse indicator. The time lapse indicator indicates an amount of time that lapsed between the time that the electronic lock 12 determined a stop in motion and the time when the electronic lock generated the broadcast message, (within a margin of error). The closer the time lapse indicator is determined to the time of transmitting the broadcast message, the better accuracy is achieved in the determination of the second time-indicator. The margin of error can be based on accuracy of measurement and/or processing times of the electronic lock performing the processing for measuring, generating the broadcast message and/or transmitting the broadcast message.

In an optional determine current time sub-step 44*a*, the portable key device 2 determines a current time of the portable key device 2. This time is thus determined according to the clock of the portable key device 2.

In an optional subtract time lapse indicator sub-step 44*b*, the portable key device 2 subtracts the time lapse indicator from the current time to obtain the second time-indicator. Since the time lapse indicator only indicates a duration and not an absolute time measurement (such as a time stamp), the second time-indicator is derived without the need to synchronise clocks between the portable key device 2 and the electronic lock.

Based on embodiments presented herein, the portable key device 2 only establishes a communication with the electronic lock 12 when the time of stop in motion determined by the portable key device 2 corresponds to the time of stop in motion determined by the electronic lock 12. In this way, only the portable key device 2 that is closest to the electronic lock 12 establishes the communication channel. If the portable key device is not carried by the user that is closest to the electronic lock 12, the times will not match, and a communication channel will not be established at this time. Eventually, when the portable key device 2 is the closest one, the times will match and the communication channel is established, allowing access control to be performed based communication over the communication channel. Hence, unnecessary, premature, establishment of communication channels is avoided.

Looking now to FIG. 3C, this illustrates optional embodiments of methods for controlling when to establish a communication channel for access control using an electronic lock 12 controlling access to a restricted physical space 16. The embodiments of FIG. 3C can optionally be combined with the embodiments of FIGS. 3A-B.

In the obtain $1^{st}$ time-indicator step 40, the portable key device 2 obtains a first time-indicator indicating when the portable key device 2 detects a stop in motion of the portable key device 2. This can e.g. be detected based on readings from an accelerometer of the portable key device 1.

In the obtain $2^{nd}$ time-indicator step 44, the portable key device 2 obtains a second time-indicator indicating when the electronic lock 12 determines a stop in motion. The second time-indicator is provided from the electronic lock 12 to the portable key device, e.g. as a broadcast message since no communication channel has been established yet between the particular portable key device 2 and the electronic lock 12.

In an optional conditional difference<time threshold step 46, the portable key device 2 determines when a difference between the first time-indicator and the second time-indicator is less than a threshold. This then indicates that the stop detection by the portable key device 2 and the stop detection by the electronic lock 12 occurred at the same time, i.e. they both detect the same stop. Hence, the stop detected by the portable key device is also the portable key device of the user that is closest to the electronic lock. When the difference between the first time-indicator and the second time-indicator is less than the threshold, the method proceeds to an optional conditional RSSI>$1^{st}$ threshold step 144. Otherwise, the method ends.

In the optional conditional RSSI>$1^{st}$ threshold step 144, the portable key device 2 determines whether a received signal strength (RSSI) of a signal from the electronic lock 12 is greater than a first threshold. If this is the case, the method proceeds to an optional notify step 146. Otherwise, the method ends. The first threshold can be configured to achieve a suitable distance for notifying the user (see next step below).

In the optional notify step 146, the portable key device 2 notifies a user 4 of the portable key device 2 of a nearby electronic lock. The user is thereby prompted whether to indicate intent to unlock the electronic lock 12. The notification can be subtle, such as a vibration or discrete sound, or the notification can be stronger, such as a visual prompt on the screen of the portable key device 2 and/or sound including a voice prompt to the user (e.g. based on speech synthesis) explicitly informing the user of the presence of the electronic lock 12 and querying whether to unlock the lock.

This step is performed after the conditional RSSI>$1^{st}$ threshold step 144. In this way, the user is notified when the user is relatively near the electronic lock, the distance depending on the value of the first threshold. This prevents unnecessary or premature notification of the opportunity to show intent.

In an optional receive user input step 148, the portable key device receives user input from the user 4 indicating intent to unlock the electronic lock 12. The user input can e.g. comprise at least one of, user tap (e.g. single tap, double tap, etc.) on the portable key device, a click on a button (e.g. a physical button or a rendered button on a touch screen of the portable key device 2) to confirm intent to unlock, and user authentication to the portable key device. The taps can e.g. be detected by an accelerometer of the portable key device 2. The different user inputs are listed above in an order of increasing user effort and increasing security. The portable key device can be configured such that acceptable user input indicating intent depends on a security level of the electronic lock. For instance, for an electronic lock for entering an office building from outside, it may be sufficient with a double tap on the portable key device 2, while for entering the office space of a particular company, the user may need to provide user authentication to the user device, e.g. in the form of face recognition, finger recognition or a passcode. As a side note, if valid user input indicating intent to unlock is never received, the method ends.

In an optional conditional RSSI>$2^{nd}$ threshold step 150, the portable key device 2 determines whether a received signal strength of a signal from an electronic lock 12 is greater than a second threshold. The second threshold is greater than the first threshold (see FIG. 2 and description above), i.e. requiring the receiver of the portable key device 2 to be closer than what is defined by the first threshold. This step is performed after the optional receive user input step 148. Hence, acceptable user intent input needs to be provided prior to this step being performed. If the received signal strength of a signal from an electronic lock 12 is greater than a second threshold, the method proceeds to the establish communication channel step 48. Otherwise, the method ends.

In the establish communication channel step 48, in this embodiment, the portable key device is now closer than the distance defined by the second threshold and the portable key device 2 establishes a (two-way) communication channel between the portable key device 2 and the electronic lock 12. Subsequently, access control can be performed by the portable key device 2 and the electronic lock 12 communicating over the communication channel.

The sequence of conditions is more than a mere combination of RSSI strength evaluation along with user input. Specifically, there are two separate RSSI strength evaluations (with increasing thresholds for comparison) and user input of intent that is required to be performed. All these three conditions need to be confirmed for a communication channel to be established. Based on this carefully constructed sequence, the portable key device 2 only establishes a communication a solution is achieved that is not only intuitive and user friendly, but also prevents excessive communication channel establishment between portable key devices and the electronic lock. Hence, resources are saved while providing a great user experience.

According to the embodiments of FIG. 3C, there is a thus sequence of conditions that need to be fulfilled prior to the portable key device establishing a connection with an electronic lock. This includes a first rough distance indication using an RSSI measurement of a signal from the electronic lock, a user input indicating intent and a second rough distance indication using a new RSSI measurement of a signal from the electronic lock, indicating a closer proximity to the electronic lock.

Figure 4:
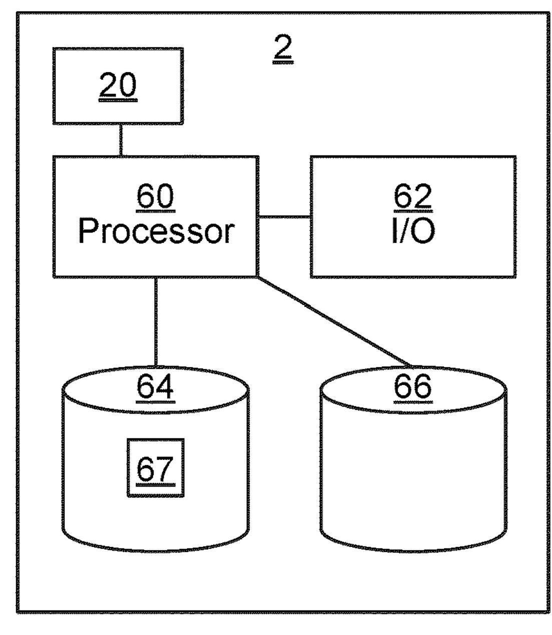
FIG. 4 is a schematic diagram illustrating components of the portable key device of FIG. 1.

FIG. 4 is a schematic diagram illustrating components of the portable key device 2 of FIG. 1. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 3A-B above.

The memory 64 can be any combination of random-access memory (RAM) and/or read-only memory (ROM). The memory 64 also comprises non-transitory persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The portable key device 2 further comprises an I/O interface 62 for communicating with external and/or internal entities. Optionally, the I/O interface 62 also includes a user interface.

An accelerometer 20 is part of the portable key device 2, indicating acceleration in three dimensions.

Other components of the portable key device 2 are omitted in order not to obscure the concepts presented herein.

Figure 5:
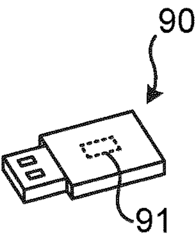
FIG. 5 shows one example of a computer program product comprising computer readable means.

FIG. 5 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 4. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

Figure 6:
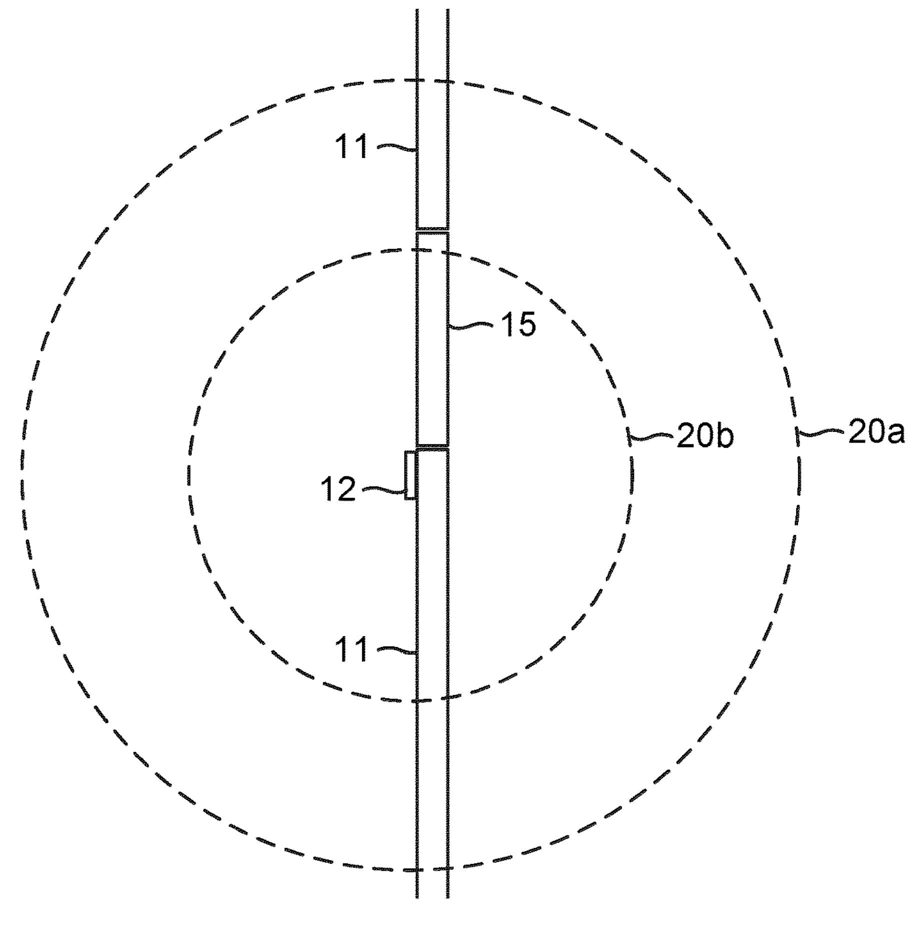
FIG. 6 is a schematic top view of the barrier and electronic lock of FIG. 1, where the effect of different RSSI thresholds is illustrated.

FIG. 6 is a schematic top view of the barrier 15 and electronic lock 12 of FIG. 1, where the effect of different RSSI thresholds is illustrated, that can be considered in conjunction with the embodiments illustrated by FIG. 3C. The RSSI measurements are performed by the portable key device 2 of a signal from the electronic lock and compared to the thresholds according to the methods described below. The signal can e.g. be a beacon signal or another broadcast signal that is not specific for a communication channel between the particular portable key device and the electronic lock.

A first circle indicates an approximate range corresponding to a first RSSI threshold 20*a* of a signal from the electronic lock 12. This first RSSI threshold 20*a* corresponds to the first threshold mentioned below. Hence, if the portable key device detects an RSSI that is greater than the first threshold, this is a rough indication of the portable key device being closer to the electronic lock 12 than the circle corresponding to the first RSSI threshold 20*a*.

A second circle indicates an approximate range corresponding to a second RSSI threshold 20*b* of a signal from the electronic lock 12. This second RSSI threshold 20*b* corresponds to the second threshold mentioned below. Since the second RSSI 20*b* is closer to the electronic lock than the first RSSI 20*a*, the second RSSI threshold 20*b* is greater than the first RSSI 20*a* (for the same signal strength emitted from the electronic lock 12). Hence, if the portable key device detects an RSSI that is greater than the second threshold, this is a rough indication of the portable key device being closer to the electronic lock 12 than the circle corresponding to the second RSSI threshold 20*b*.

The actual RSSI as measured by the receiver of the portable key device 2 depends on a variety of factors, including placement of the portable key device 2 (in pocket, handbag or in hand), intermediate or reflecting objects, etc. Nevertheless, the RSSI is a good rough estimate of distance to the transmitter, in this case the electronic lock 12. The greater the RSSI is, the closer the receiver of the portable key device 2 is to the signal source, i.e. the electronic lock in this case.

Here now follows a set of embodiments, enumerated with roman numerals.

i. A method for determining when to establish a communication channel for access control using an electronic lock controlling access to a restricted physical space, the method being performed by a portable key device, the method comprising:

obtaining a first time-indicator indicating when the portable key device detects a stop in motion of the portable key device;

receiving a broadcast message from the electronic lock;

deriving a second time-indicator based on the received broadcast message, the second time-indicator indicating when the electronic lock determines a stop in motion;

determining that a difference between the first time-indicator and the second time-indicator is less than a threshold; and establishing a communication channel between the portable key device and the electronic lock when it is determined that the difference between the first time-indicator and the second time-indicator is less than the threshold.

ii. The method according to embodiment i, wherein the broadcast message comprises a time lapse indicator and wherein the deriving the second time-indicator comprises:

determining a current time of the portable key device; and subtracting the time lapse indicator from the current time to obtain the second time-indicator.

iii. The method according to embodiment ii, wherein the time lapse indicator indicates an amount of time that lapsed between the time that the electronic lock determined a stop in motion and the time when the electronic lock generated the broadcast message, within a margin of error.

iv. The method according to any one of the preceding embodiments, wherein the obtaining a first time-indicator is based on accelerometer data of the portable key device (2).

v. A portable key device for determining when to establish a communication channel for access control using an electronic lock controlling access to a restricted physical space, the portable key device comprising:

a processor; and a memory storing instructions that, when executed by the processor, cause the portable key device to:

obtain a first time-indicator indicating when the portable key device detects a stop in motion of the portable key device;

receive a broadcast message from the electronic lock;

derive a second time-indicator based on the received broadcast message, the second time-indicator indicating when the electronic lock determines a stop in motion;

determine that a difference between the first time-indicator and the second time-indicator is less than a threshold; and establish a communication channel between the portable key device and the electronic lock when it is determined that the difference between the first time-indicator and the second time-indicator is less than the threshold.

vi. The portable key device according to embodiment v, wherein the broadcast message comprises a time lapse indicator and wherein the instructions to derive the second time-indicator comprise instructions that, when executed by the processor, cause the portable key device to:

determine a current time of the portable key device; and subtract the time lapse indicator from the current time to obtain the second time-indicator.

vii. The portable key device according to embodiment vi, wherein the time lapse indicator indicates an amount of time that lapsed between the time that the electronic lock determined a stop in motion and the time when the electronic lock generated the broadcast message, within a margin of error.

viii. The portable key device according to any one of embodiments v to vii, wherein the instructions to obtain comprise instructions that, when executed by the processor, cause the portable key device to obtain the first time-indicator based on accelerometer data of the portable key device.

ix. A computer program for determining when to establish a communication channel for access control using an electronic lock controlling access to a restricted physical space, the computer program comprising computer program code which, when executed on a portable key device, causes the portable key device to:

obtain a first time-indicator indicating when the portable key device detects a stop in motion of the portable key device;

receive a broadcast message from the electronic lock;

derive a second time-indicator based on the received broadcast message, the second time-indicator indicating when the electronic lock determines a stop in motion;

determine that a difference between the first time-indicator and the second time-indicator is less than a threshold; and establish a communication channel between the portable key device and the electronic lock when it is determined that the difference between the first time-indicator and the second time-indicator is less than the threshold.

x. A computer program product comprising a computer program according to embodiment ix and a computer readable means comprising non-transitory memory in which the computer program is stored.

xi. A method for controlling when to establish a communication channel for access control using an electronic lock controlling access to a restricted physical space, the method being performed by a portable key device, the method comprising:

determining that a received signal strength of a signal from the electronic lock is greater than a first threshold;

notifying a user of the portable key device of a nearby electronic lock;

receiving user input from the user indicating intent to unlock the electronic lock;

determining that a received signal strength of a signal from an electronic lock is greater than a second threshold, wherein the second threshold is greater than the first threshold; and establishing a communication channel between the portable key device and the electronic lock after determining that the received signal strength is greater than the second threshold.

xii. The method according to embodiment xi, further comprising:

obtaining a first time-indicator indicating when the portable key device detects a stop in motion of the portable key device;

obtaining a second time-indicator indicating when the electronic lock determines a stop in motion; and determining that a difference between the first time-indicator and the second time-indicator is less than a time threshold.

xiii. The method according to embodiment xi or xii, wherein the user input comprises at least one of, user tap on the portable key device, a click on a button to confirm intent to unlock, and user authentication to the portable key device.

xiv. The method according to embodiment xiii, wherein acceptable user input indicating intent depends on a security level of the electronic lock.

xv. A portable key device for controlling when to establish a communication channel for access control using an electronic lock controlling access to a restricted physical space, the portable key device comprising:

a processor; and a memory storing instructions that, when executed by the processor, cause the portable key device to:

determine that a received signal strength of a signal from the electronic lock is greater than a first threshold;

notify a user of the portable key device of a nearby electronic lock;

receive user input from the user indicating intent to unlock the electronic lock;

determine that a received signal strength of a signal from an electronic lock is greater than a second threshold, wherein the second threshold is greater than the first threshold; and establish a communication channel between the portable key device and the electronic lock after determining that the received signal strength is greater than the second threshold.

xvi. The portable key device according to embodiment xv, further comprising instructions that, when executed by the processor, cause the portable key device to:

obtain a first time-indicator indicating when the portable key device detects a stop in motion of the portable key device;

obtain a second time-indicator indicating when the electronic lock determines a stop in motion; and determine that a difference between the first time-indicator and the second time-indicator is less than a time threshold.

xvii. The portable key device according to embodiment xv or xvi, wherein the user input comprises at least one of, user tap on the portable key device, a click on a button to confirm intent to unlock, and user authentication to the portable key device.

xviii. The portable key device according to embodiment xvii, further comprising instructions that, when executed by the processor, cause the portable key device to consider acceptable user input indicating intent depending on a security level of the electronic lock.

xix. A computer program for controlling when to establish a communication channel for access control using an electronic lock controlling access to a restricted physical space, the computer program comprising computer program code which, when executed on a portable key device causes the portable key device to:

determine that a received signal strength of a signal from the electronic lock is greater than a first threshold;

notify a user of the portable key device of a nearby electronic lock;

receive user input from the user indicating intent to unlock the electronic lock;

determine that a received signal strength of a signal from an electronic lock is greater than a second threshold, wherein the second threshold is greater than the first threshold; and establish a communication channel between the portable key device and the electronic lock after determining that the received signal strength is greater than the second threshold.

xx. A computer program product comprising a computer program according to embodiment xix and a computer readable means comprising non-transitory memory in which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for determining when to establish a communication channel for access control using an electronic lock controlling access to a restricted physical space, the method being performed by a portable key device, the method comprising:

obtaining a first time-indicator indicating when the portable key device detects a stop in motion of the portable key device;

receiving a broadcast message from the electronic lock, wherein the broadcast message comprises a time lapse indicator;

deriving a second time-indicator based on the received broadcast message, the second time-indicator indicating when the electronic lock determines a stop in motion by detecting a stop of a nearby object using a fixedly mounted sensor;

determining that a difference between the first time-indicator and the second time-indicator is less than a threshold; and establishing a communication channel between the portable key device and the electronic lock when it is determined that the difference between the first time-indicator and the second time-indicator is less than the threshold;

wherein the deriving the second time-indicator comprises:

determining a current time of the portable key device; and subtracting the time lapse indicator from the current time to obtain the second time-indicator.

2. The method according to claim 1, wherein the time lapse indicator indicates an amount of time that lapsed between a time that the electronic lock determined the stop in motion and a time when the electronic lock generated the broadcast message, within a margin of error.

3. The method according to claim 1, wherein the obtaining the first time-indicator is based on accelerometer data of the portable key device.

4. The method according to claim 1, wherein the establishing the communication channel comprises establishing the communication channel between the portable key device and the electronic lock only when it is determined that the difference between the first time-indicator and the second time-indicator is less than the threshold.

5. The method according to claim 1, further comprising:

determining that a received signal strength of a signal from the electronic lock is greater than a first threshold;

notifying a user of the portable key device of the nearby electronic lock;

receiving user input from the user indicating intent to unlock the electronic lock; and determining that a received signal strength of a signal from the electronic lock is greater than a second threshold, wherein the second threshold is greater than the first threshold;

wherein the establishing the communication channel between the portable key device and the electronic lock is performed after determining that the received signal strength is greater than the second threshold.

6. A portable key device for determining when to establish a communication channel for access control using an electronic lock controlling access to a restricted physical space, the portable key device comprising:

a processor; and a memory storing instructions that, when executed by the processor, cause the portable key device to:

obtain a first time-indicator indicating when the portable key device detects a stop in motion of the portable key device;

receive a broadcast message from the electronic lock, wherein the broadcast message comprises a time lapse indicator;

derive a second time-indicator based on the received broadcast message, the second time-indicator indicating when the electronic lock determines a stop in motion by detecting a stop of a nearby object using a fixedly mounted sensor;

determine that a difference between the first time-indicator and the second time-indicator is less than a threshold; and establish a communication channel between the portable key device and the electronic lock when it is determined that the difference between the first time-indicator and the second time-indicator is less than the threshold;

wherein the instructions to derive the second time-indicator comprise instructions that, when executed by the processor, cause the portable key device to:

determine a current time of the portable key device; and subtract the time lapse indicator from the current time to obtain the second time-indicator.

7. The portable key device according to claim 6, wherein the time lapse indicator indicates an amount of time that lapsed between a time that the electronic lock determined the stop in motion and a time when the electronic lock generated the broadcast message, within a margin of error.

8. The portable key device according to claim 6, wherein the instructions to obtain comprise instructions that, when executed by the processor, cause the portable key device to obtain the first time-indicator based on accelerometer data of the portable key device.

9. The portable key device according to claim 6, wherein the instructions to establish the communication channel comprise instructions that, when executed by the processor, cause the portable key device to establish the communication channel between the portable key device and the electronic lock only when it is determined that the difference between the first time-indicator and the second time-indicator is less than the threshold.

10. The portable key device according to claim 6 to further comprising instructions that, when executed by the processor, cause the portable key device to:

determine that a received signal strength of a signal from the electronic lock is greater than a first threshold;

notify a user of the portable key device of the nearby electronic lock;

receive user input from the user indicating intent to unlock the electronic lock; and determine that a received signal strength of a signal from the electronic lock is greater than a second threshold, wherein the second threshold is greater than the first threshold;

wherein the instructions to establish the communication channel between the portable key device and the electronic lock comprise instructions that, when executed by the processor, cause the portable key device to establish the communication channel after determining that the received signal strength is greater than the second threshold.

11. A non-transitory computer-readable medium comprising a computer program stored thereon for determining when to establish a communication channel for access control using an electronic lock controlling access to a restricted physical space, the computer program comprising computer program code which, when executed on a portable key device, causes the portable key device to:

obtain a first time-indicator indicating when the portable key device detects a stop in motion of the portable key device;

receive a broadcast message from the electronic lock, wherein the broadcast message comprises a time lapse indicator;

derive a second time-indicator based on the received broadcast message, the second time-indicator indicating when the electronic lock determines a stop in motion by detecting a stop of a nearby object using a fixedly mounted sensor;

determine that a difference between the first time-indicator and the second time-indicator is less than a threshold; and establish a communication channel between the portable key device and the electronic lock when it is determined that the difference between the first time-indicator and the second time-indicator is less than the threshold;

wherein the computer program code to derive the second time-indicator comprises computer program code that, when executed on the portable key device, causes the portable key device to:

determine a current time of the portable key device; and subtract the time lapse indicator from the current time to obtain the second time-indicator.

* * * * *